(12) United States Patent
Spinella et al.

(10) Patent No.: US 6,403,913 B1
(45) Date of Patent: Jun. 11, 2002

(54) ELECTRODE GEOMETRY DESIGN FOR OPTIMIZED ALUMINUM RESISTANCE SPOT WELDING

(75) Inventors: Donald J. Spinella, Greensburg; Charles J. Kostie, Brackenridge, both of PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 09/557,635

(22) Filed: Apr. 25, 2000

(51) Int. Cl.[7] .............................. B23K 9/24; B23K 11/30
(52) U.S. Cl. .......................................... 219/119
(58) Field of Search .......................... 219/119

(56) References Cited

U.S. PATENT DOCUMENTS

| | | | | |
|---|---|---|---|---|
| 3,721,796 A | * | 3/1973 | Reed | 219/119 |
| 4,476,372 A | * | 10/1984 | Prucher | 219/120 |
| 4,728,765 A | * | 3/1988 | Prucher | 219/120 |
| 4,954,687 A | * | 9/1990 | Bush et al. | 219/119 |
| 4,972,047 A | * | 11/1990 | Puddle et al. | 219/118 |
| 5,015,816 A | * | 5/1991 | Bush et al. | 219/119 |
| 5,041,711 A | * | 8/1991 | Prucher | 219/119 |
| 5,155,320 A | * | 10/1992 | Simmons | 219/120 |
| 5,391,854 A | * | 2/1995 | Namba et al. | 219/118 |
| 5,961,853 A | * | 10/1999 | Thornton | 219/85.14 |
| 6,140,825 A | * | 10/2000 | Fujii et al. | 324/718 |

OTHER PUBLICATIONS

"Welding Kaiser Aluminum", 1st Ed., Kaiser Aluminum & Chemical Sales, Inc., Kaiser Center, Oakland, california 94604, ®1967, pp. 11–36 & 11–37.

"Resistance Welding Manual", 4th Ed., Resistance Welder Manufacturers' Assoc., ®1989, pp. 11–22, 11–23, 18–15 & 18–16.

"Guidelines to Resistance Spot Welding Aluminum Automotive Sheet—T10", the Aluminum Association Inc. (No Date Available).

\* cited by examiner

*Primary Examiner*—Tom Dunn
*Assistant Examiner*—Zidia Pittman
(74) *Attorney, Agent, or Firm*—Charles Q. Buckwalter; Julie W. Meder; Matthew W. Smith (57) ABSTRACT

A modification of the electrode geometry for resistance spot welding of aluminum. A ratio of the surface area of the weld nugget to the surface area of the electrode face is about 0.75 to about 1. The diameter of the electrode face is smaller than the industry recommended size and which provides higher current density and reduces the amount of power needed for welding aluminum.

6 Claims, 8 Drawing Sheets

ELECTRODE GEOMETRY DESIGN FOR OPTIMIZED ALUMINUM RESISTANCE SPOT WELDING

FIELD OF THE INVENTION

The present invention relates to electrodes for aluminum resistance spot welding, more particularly to improved electrodes for reducing the overall energy required to resistance spot weld aluminum.

BACKGROUND OF THE INVENTION

Resistance spot welding is widely used for spot welding of steel and other metals, particularly in the assembly of automobile bodies and truck bodies. An apparatus for resistance spot welding includes a pair of resistance welding electrodes. Typically, a robot weld gun fitted with a pair of electrodes is moved in stages along a continuous weld path. At each stage, the electrodes are pressed against opposing sides of the work pieces to be welded, and an electric current is passed through the electrodes in the work pieces. The electrical resistance of the metal work pieces produces localized heating which causes the work pieces to fuse at a weld site. The electrical heating at the point of pressure between the electrodes forms a molten nugget at the interface between the work pieces. Typically, welds are oval in shape. The ovality of a weld nugget is dependent on the rigidity of the welding equipment and the condition of the electrodes. The diameter of a weld is considered to be an average value for the weld and is conventionally determined to be the average of the maximum diameter and the minimum diameter of the weld nugget.

Figure 1:
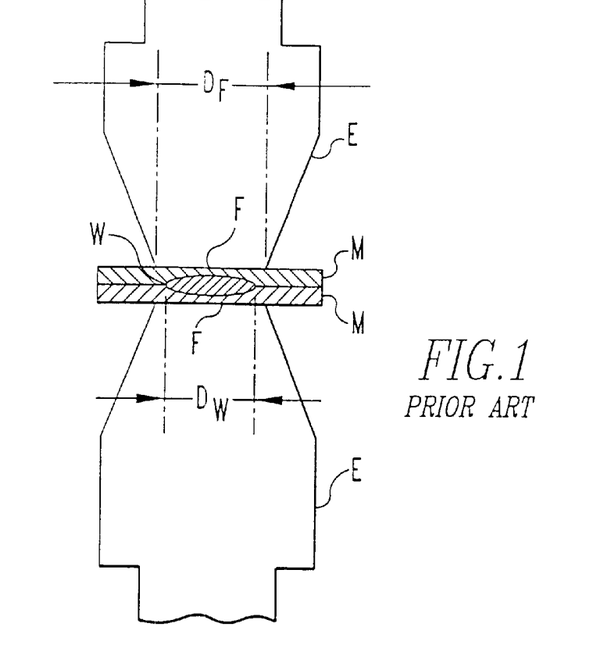
FIG. 1 is a schematic of a partial cross-section of work pieces, electrodes and weld nuggets of the prior art.

Electrodes are typically made from copper or copper alloys to provide low electrical resistivity and allow high current flow therethrough. The tips of the electrode closest to the work pieces have geometrical configurations which are determined by the particular needs of the welding process. Typical geometrical configurations of an electrode tip include pointed, dome, flat, offset, truncated and radius. Electrodes with radius tips are substantially cylindrical with a generally convex face for contact with the work piece. Electrodes with truncated tips have a frustoconical shape with a generally flat face for contacting the work piece. As shown in FIG. 1, conventional electrode tips E are placed on opposing sides of a pair of metal work pieces M. The faces F of the electrode E contact opposing sides of the metal work pieces M. Upon application of electrical heat and pressure, a weld nugget W forms between the metal work pieces M.

The industry recommended specifications for equipment and process parameters for resistance spot welding aluminum is set forth in a publication by the Aluminum Association entitled "T10 Guidelines to Resistance Spot Welding Automotive Sheet", hereinafter the "AAT10 Guidelines". The AAT10 Guidelines specify the minimum weld nugget diameter ($D_W$) and electrode face diameter ($D_F$) for a range of thickness (gauge) of aluminum sheet to be welded. Based on these specifications, the recommended ratio of the surface area of the weld ($A_W$) to the surface area of the electrode face ($A_F$) is about 0.2 to about 0.4 for radius electrode tips and over about 0.4 to about 0.7 for truncated electrode tips. This relationship is shown schematically in FIG. 1 where it can be seen that $D_F$ is substantially larger than $D_W$.

Much of the resistance spot welding equipment in place today is designed for use in welding steel. It is desirable to weld other metals using this readily available equipment. For example, in the automotive industry, an increasing number of steel components are being replaced by aluminum. These aluminum components are preferably assembled using the welding equipment of their steel counterparts. However, aluminum has higher electrical conductivity and higher thermal conductivity than steel. Much of the heat generated in aluminum work pieces dissipates through the work pieces. As a result, resistance spot welding of aluminum using steel resistance spot welding parameters typically results in insufficient weld strength and inferior weld performance.

To overcome the heat losses due to the high conductivity of aluminum when using the electrodes of steel welding equipment, the amount of current passed between the electrodes typically is about three times the amount of current required to weld a similar gauge of steel. For example, resistance spot welding of steel typically requires about 10,000 to 15,000 amps, whereas resistance spot welding of aluminum conventionally requires about 20,000 to 50,000 amps. Hence, resistance spot welding of aluminum requires significantly higher current to achieve sufficient heat at the weld point between the electrodes than is required for welding steel. Production of these higher current levels requires heavier duty equipment which is more difficult to manipulate and operate using conventional robotics. Higher welding currents are detrimental the electrodes and decrease electrode life. Aluminum resistance spot welding is at a significant cost disadvantage as compared to welding of steel in terms of the expenses associated with higher current and shorter electrode life.

In addition, certain aluminum alloys such as those of the Aluminum Association alloy series 5xxx and 6xxx have heretofore been difficult to resistance spot weld. For example, resistance spot welding of 5xxx series alloys (such as alloys 5182-O and 5754-O) may exhibit expulsion and whiskering of the weld nugget. Resistance spot welding of 6xxx series alloys (such as alloys 6022-T4 and 6111-T4) is problematic due to the high thermal conductivity and electrical conductivity of 6xxx series alloys which renders them difficult to sufficiently heat to form an acceptable weld nugget at acceptably low currents.

Accordingly, a need remains for a method of resistance spot welding aluminum using conventional steel welding apparatuses at commercially acceptable power levels and resulting in acceptable electrode life.

SUMMARY OF THE INVENTION

This need is met by the apparatus and method of the present invention for resistance spot welding aluminum work pieces. The apparatus includes a pair of electrodes for positioning on opposing sides of a pair of aluminum work pieces to form a weld nugget between the aluminum work pieces with each electrode having a tip and a face. The improvement of the invention resides in the use of at least one electrode face which is sized so that ratio of the surface area of the weld nugget to the surface area of the electrode face is about 0.75 to about 1. Preferably, both electrode faces are sized so that the ratio of the surface area of the weld nugget to the surface area of each electrode face is about 0.75 to about 1. The diameter of the weld nugget ($D_W$) is preferably about equal to the formula $5 \cdot \sqrt{t}$ (five times the square root of t) where t is the gauge of the thinnest work piece being welded. The electrode tip is preferably truncated in shape.

The present invention also includes a method of resistance spot welding aluminum work pieces including steps of (1) contacting the opposing sides of a pair of aluminum pieces with a pair of opposing electrodes, each electrode having a tip with a face and (2) passing current from one electrode to the other electrode such that a weld nugget forms between the work pieces, wherein a ratio of the surface area of the weld nugget to the surface area of the electrode face is about 0.75 to about 1. The aluminum work pieces may be formed from alloys including but not limited to Aluminum Association 2xxx, 3xxx, 5xxx or 6xxx series alloys.

BRIEF DESCRIPTION OF THE DRAWINGS

A complete understanding of the invention will be obtained from the following description when taken in connection with the accompanying drawing figures wherein like reference characters identify like parts throughout.

DETAILED DESCRIPTION OF PREFERRED EMBODIMENTS

For the purposes of the description hereinafter, the terms "upper", "lower", "right", "left", "vertical", "horizontal", "top", "bottom", and derivatives thereof shall relate to the invention as it is oriented in the drawings. However, it is to be understood that the invention may assume various alternative variations in step sequences except where expressly specified to the contrary. It is also understood that the specific devices and processes illustrated in the attached drawings and described in the following specification are simply exemplary embodiments of the invention.

Figure 2:
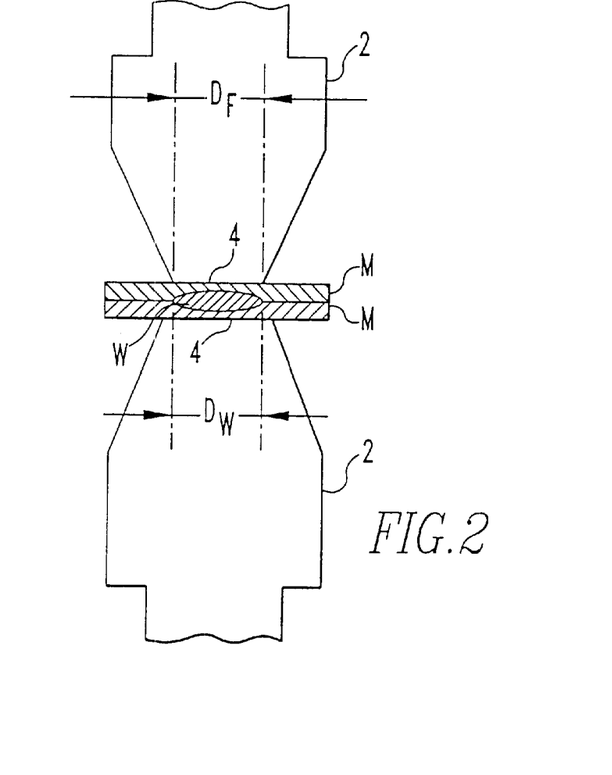
FIG. 2 is a schematic of a partial cross-section of work pieces, electrodes and a weld nugget according to the present invention.

The present invention shown in FIG. 2 utilizes electrodes 2 which are placed on opposing sides of a pair of metal work pieces M in a conventional manner. The faces 4 of the electrodes 2 contact opposing sides of the metal work pieces M. Upon application of electrical heat and pressure, a weld nugget W forms between the metal work pieces M. While conventional aluminum resistance spot welding utilizes electrodes having faces which are significantly larger than the diameter of the weld nugget produced such that the ratio of the weld nugget surface area ($A_W$) to the electrode face surface area ($A_F$) is 0.7 or less, the present invention includes an increase in the ratio of $A_W$ to $A_F$ from the prior art. The weld nugget surface area ($A_W$) is determined as $\pi D_W^2$, where $D_W$ is the average of the maximum diameter and the minimum diameter of the weld nugget.

The work pieces M are referred to hereinafter as being in the form of sheets, however, other aluminum products may be welded according to the present invention. For example, the present invention may be used to weld a sheet to a cast product or to an extruded product or to weld an extruded product to a cast product.

As shown in FIG. 2, in the present invention, $D_W$ is equal to or less than $D_F$, such that $A_W$ is equal to or less than $A_F$. FIG. 2 shows $D_W$ about equal to $D_F$, but this is exemplary only, as the ratio of $A_W$ to $A_F$ in the present invention is about 0.75 to about 1. This increased ratio of $A_W$ to $A_F$ is preferably accomplished by using an electrode with a face diameter ($D_F$) which is smaller than the electrode face diameter recommended by the AAT10 Guidelines for a particular sheet gauge. The sheet gauge selected is typically based on the minimum thickness of the work piece. FIG. 2 shows both of the opposing electrodes having a reduced face diameter, however also included in the present invention is the use of one conventional electrode and one electrode having a face sized such that the ratio of $A_W$ to $A_F$ is about 0.75 to about 1. The shape of the electrode tips may be any of the types A–F of the Resistance Welder Manufacturers' Association of pointed (Type A), domed (Type B), flat (Type C), offset (Type D), truncated (Type E) or radius (Type F). This is not meant to be limiting as other electrode configurations may be used in the present invention provided that the ratio of the surface area of the weld nugget ($A_W$) to the surface area of at least one electrode face ($A_F$) which contacts the work piece is about 0.75 to about 1.

Figure 3:
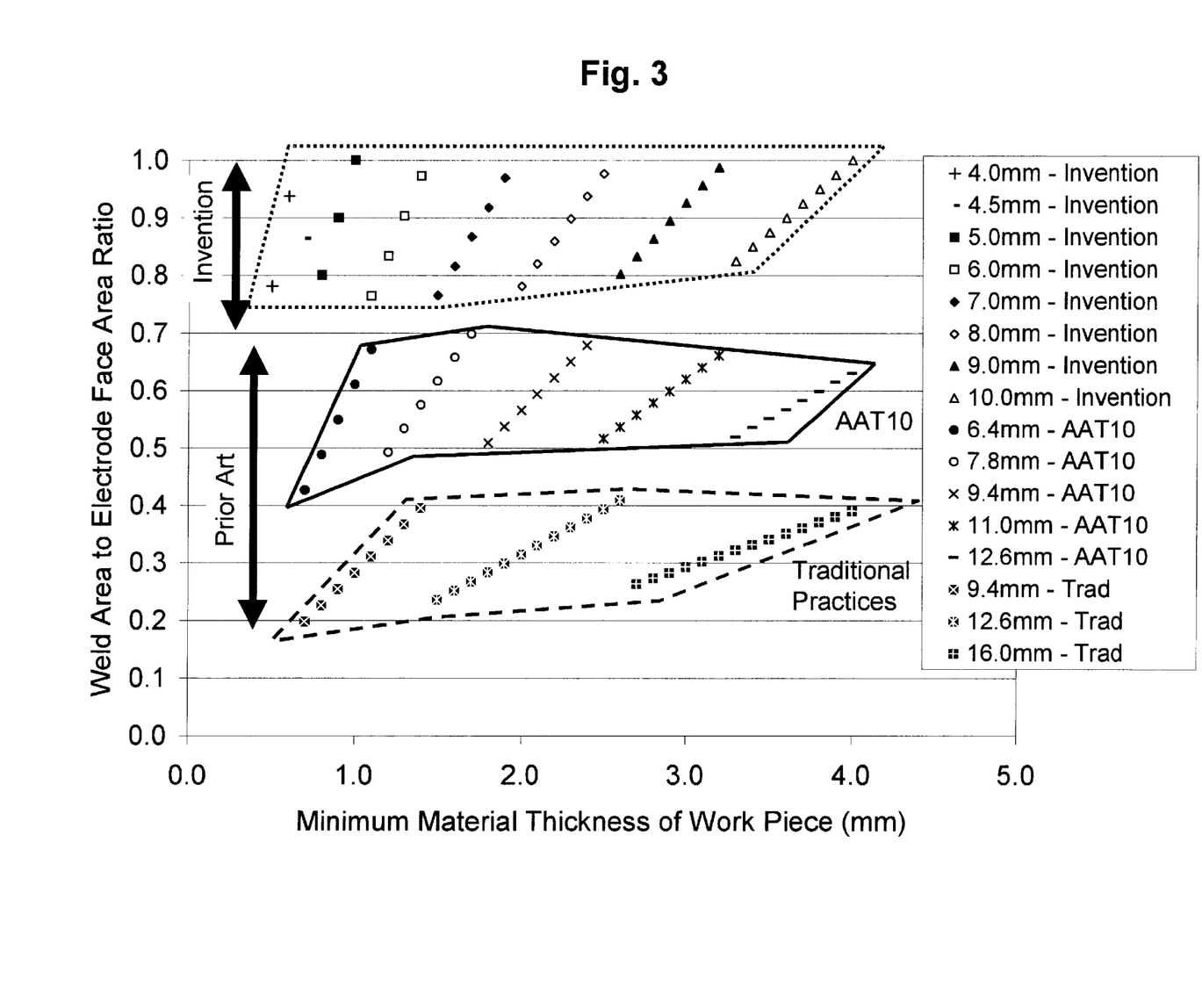
FIG. 3 is a graph of the ratio of weld nugget surface area to electrode surface area of the prior art and of the present invention.

A comparison of theoretical ratios of $A_W$ to $A_F$ of the prior art to theoretical ratios of $A_W$ to $A_F$ of the present invention is presented in FIG. 3 as a graph of area ratio versus thickness of the material being welded using various diameters of the electrode face ($D_F$). The prior art data includes one group of data points labeled as "AAT10" per the AAT10 Guidelines for truncated electrodes (at $D_F$ of 6.4 to 12.6 mm) and another group of data points labeled as "Traditional Practices" for flat electrodes (at $D_F$ of 9.4 to 16.0 mm) based on commonly used electrodes for aluminum resistance spot welding. The modified electrode face diameter of the present invention presented in FIG. 3 is 4.0 to 10.0 mm. FIG. 3 shows that for a particular thickness of material being welded and a particular weld nugget diameter ($D_W$), the electrode face diameter ($D_F$) used according to the present invention is smaller than the face diameters of AAT10 recommended electrodes and the commonly used electrodes of the prior art.

The present invention further includes a method of resistance spot welding aluminum including steps of (1) contacting the opposing sides of a pair of aluminum work pieces with a pair of opposing electrodes, each electrode having a tip with a face and (2) passing current from one electrode to the other electrode such that a weld nugget forms between the work pieces, wherein a ratio of the surface area of the weld nugget to the surface area of one or both of the electrode faces is about 0.75 to about 1. For structural welds, the diameter of the weld nugget formed is preferably about equal to the formula 5·√t where t is the gauge of the thinnest work piece being welded. For in process or manufacturing welds, the diameter of the weld nugget formed may be about equal to the formula 4·√t or less. The amount of current passing between the electrodes may be about 15,000 amps to about 45,000 amps.

As described in detail below, benefits of higher localized current and increased electrode pressure over the current and pressure used in conventional aluminum resistance spot welding include reduced overall energy which is required to achieve resistance spot welding of aluminum, longer electrode life, reduced peak current, more uniform weld development, reduced flange overlap of the work pieces being welded, and reduced demand and capacity requirements of the welding equipment. Moreover, certain aluminum alloys which have heretofore been difficult to resistance spot weld using preexisting resistance spot welding equipment for steel, including 2xxx, 3xxx, 5xxx and 6xxx Aluminum Association series alloys, are weldable according to the present invention. In particular, alloys 5182, 5754, 6022 and 6111 may be successfully spot welded according to the present invention.

Figure 4:
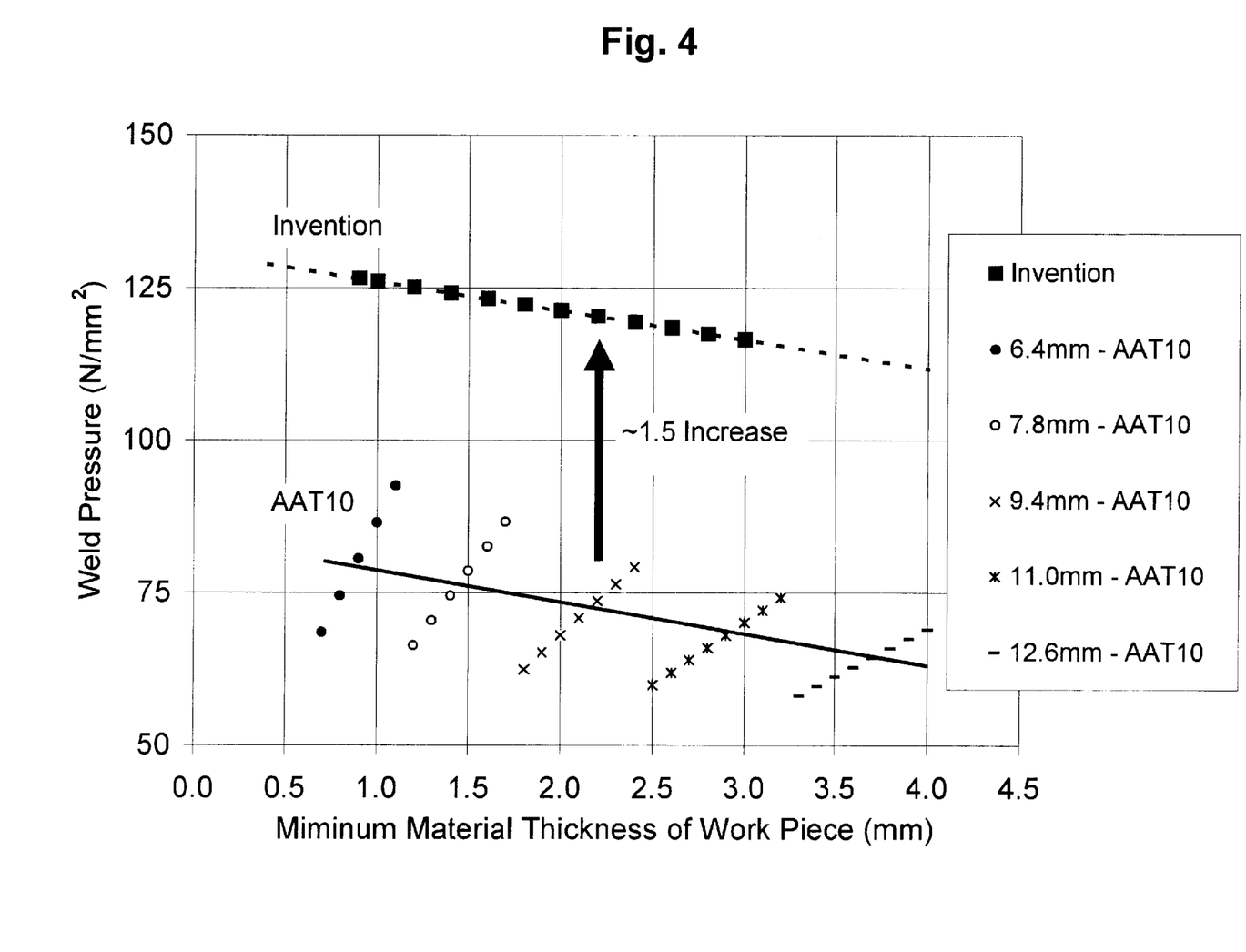
FIG. 4 is a graph of weld pressure versus work piece thickness achieved using the electrodes the present invention compared to prior art electrodes.

The present invention provides higher weld pressures than the weld pressures achievable using the electrode geometry recommended by the AAT10 Guidelines. This is shown in FIG. 4 which is a graph of weld pressure versus material thickness of various diameter electrode faces (diameters of 6.4, 7.8, 9.4, 11.0 and 12.6 mm) recommended by the AAT10 Guidelines compared to the weld pressures achievable using the modified geometry of the resistance spot welding electrodes of the present invention. The present invention results in an about 50 percent increase in the pressure applied to the electrodes which serves to improve the weld formed between aluminum work pieces. In particular, the present invention has been found to reduce weld expulsion, reduce electrode wear, reduce the overall required welding pressure and increase the current distribution across the interface between the electrode face and the work piece. It is believed that the increased pressure applied in the location of the weld nugget according to the present invention results in improved contact at the interface between the electrode and the work piece. Improved contact between the electrode and the work piece allows a greater amount of the electrode face to contact the work piece with concomitant increased uniformity in the distribution of current across the electrode face, and hence, increased uniformity in electrode wear.

Figure 5:
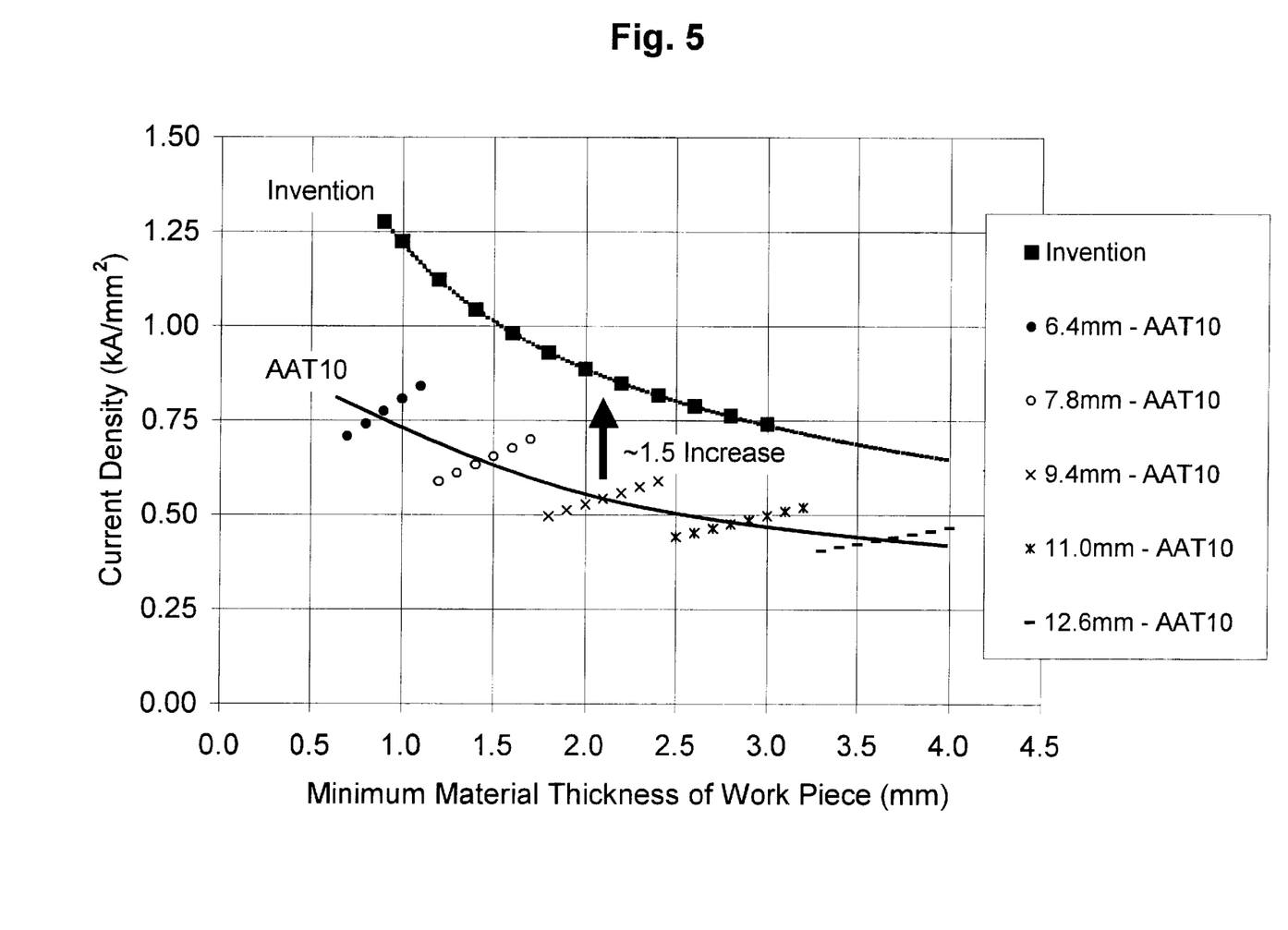
FIG. 5 is a graph of the current density versus work piece thickness achieved using the electrodes of the present invention compared to prior art electrodes.
Figure 6:
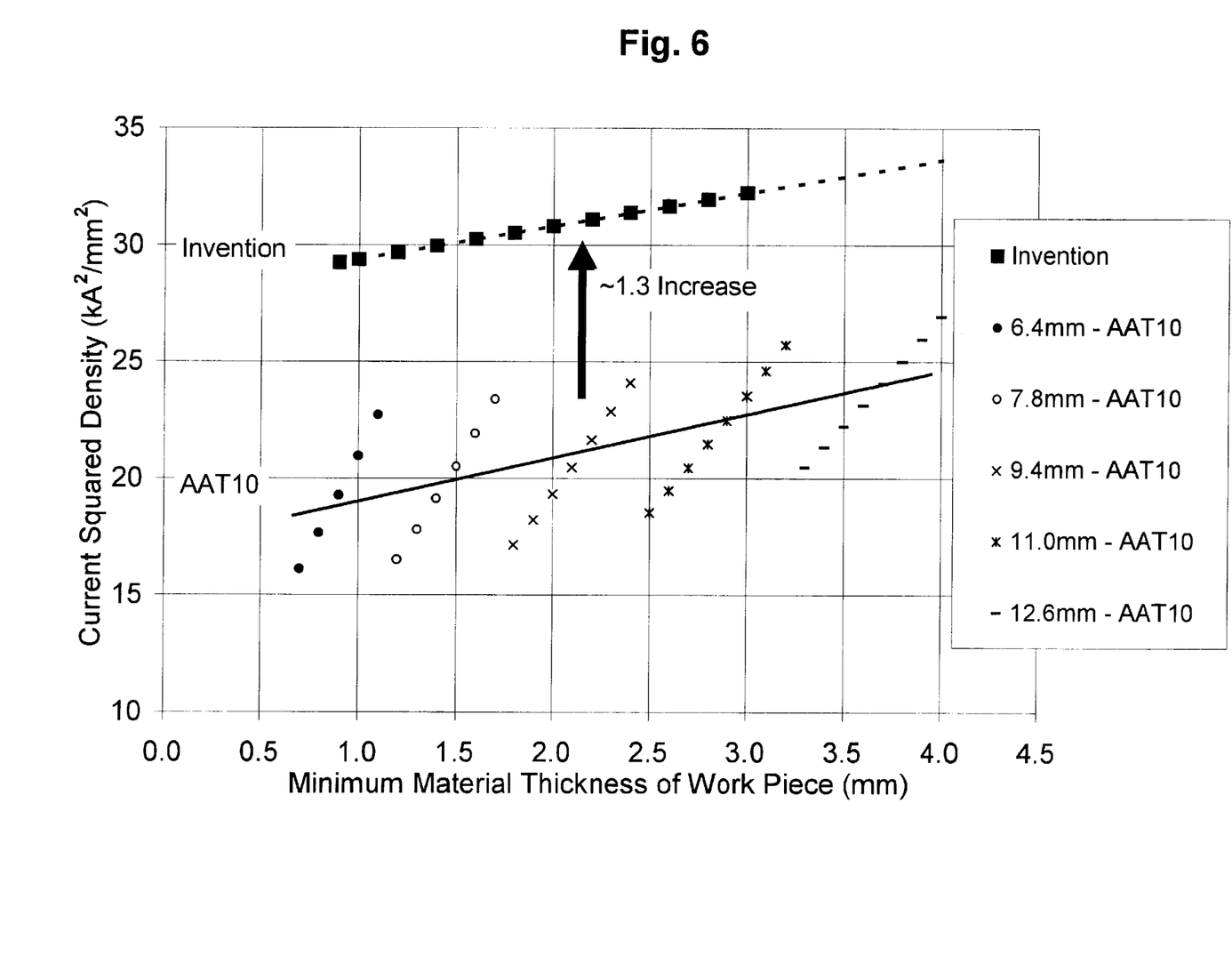
FIG. 6 is a graph of the peak current squared density versus work piece thickness achieved using the electrodes of the present invention compared to prior art electrodes.

FIGS. 5 and 6 compare the current density and the current squared density, respectively, applied to various thicknesses of aluminum work pieces using the electrode face diameters of 6.4, 7.8, 9.4, 11.0 and 12.6 mm recommended in the AAT10 Guidelines and the electrode geometry of the present invention. While reducing the overall current needed to resistance spot weld aluminum from conventional requirements therefor, approximately 50 percent higher current density and 30 percent higher current squared density are achievable using the electrode geometry of the present invention as compared to the electrode geometry of the AAT10 Guidelines.

Figure 7:
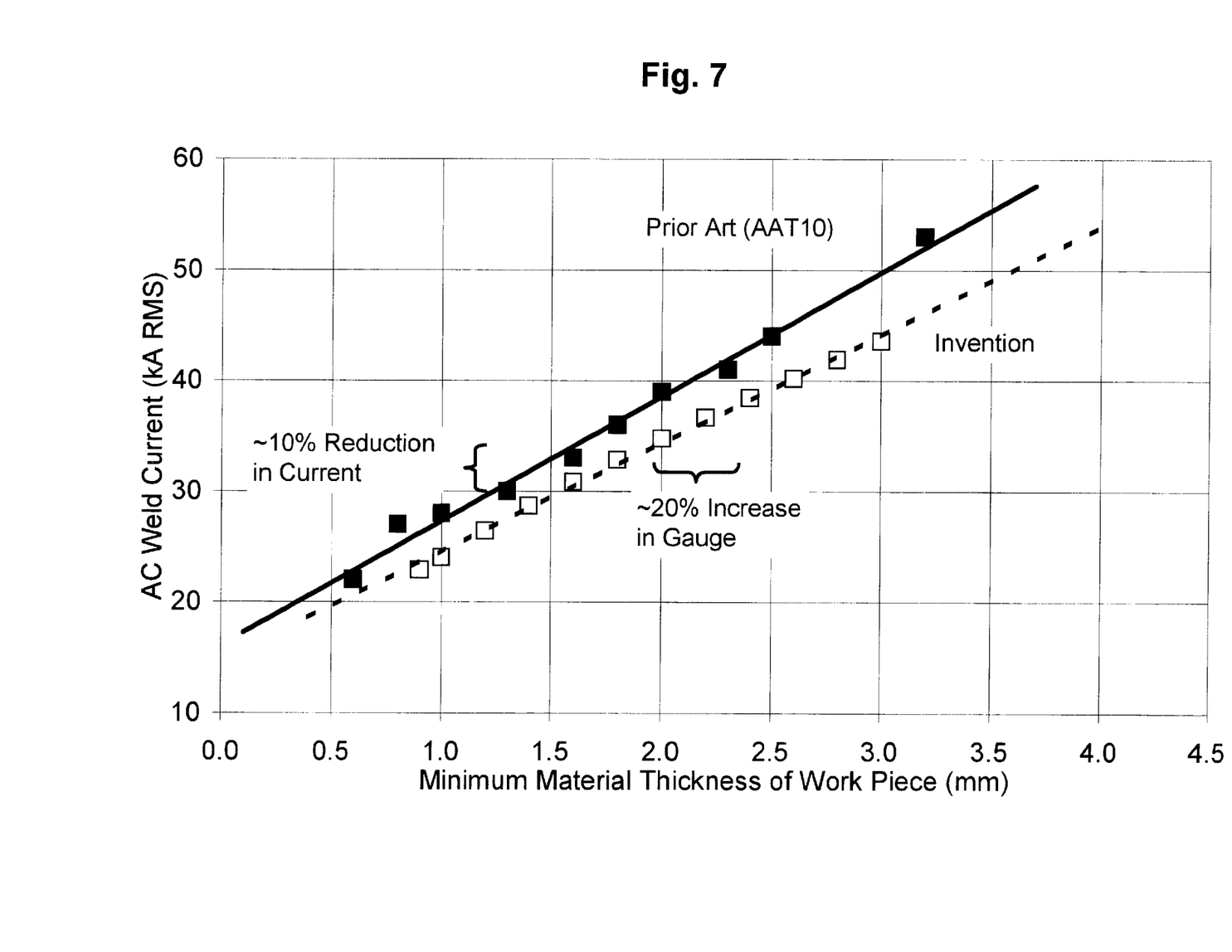
FIG. 7 is a graph of the weld current versus material thickness achieved using the electrodes of the present invention compared to prior art electrodes.

As a result of the increased pressure, increased current density and increased current squared density achievable by the present invention, the gauge of metal which can be welded using the electrodes of the present invention is at least about 20 percent greater than that weldable according to the AAT10 Guidelines. Likewise, for a particular gauge of metal, the weld current may be reduced by at least about 10 percent from the current recommended by the AAT10 Guidelines. This is depicted graphically in FIG. 7 which presents the weld current versus material thickness for the present invention and for the prior art electrode geometry. For example, for a welding current level of 30,000 amps, the AAT10 Guidelines indicate that aluminum work pieces of about 1.25 mm thick may be welded. However, using the electrode geometry of the present invention, it is possible to weld thicker material, up to about 1.6 mm thick. Hence, for the same amount of current used to weld aluminum sheet of a certain thickness according to the prior art, the present invention can be used to weld thicker sheet.

Figure 8:
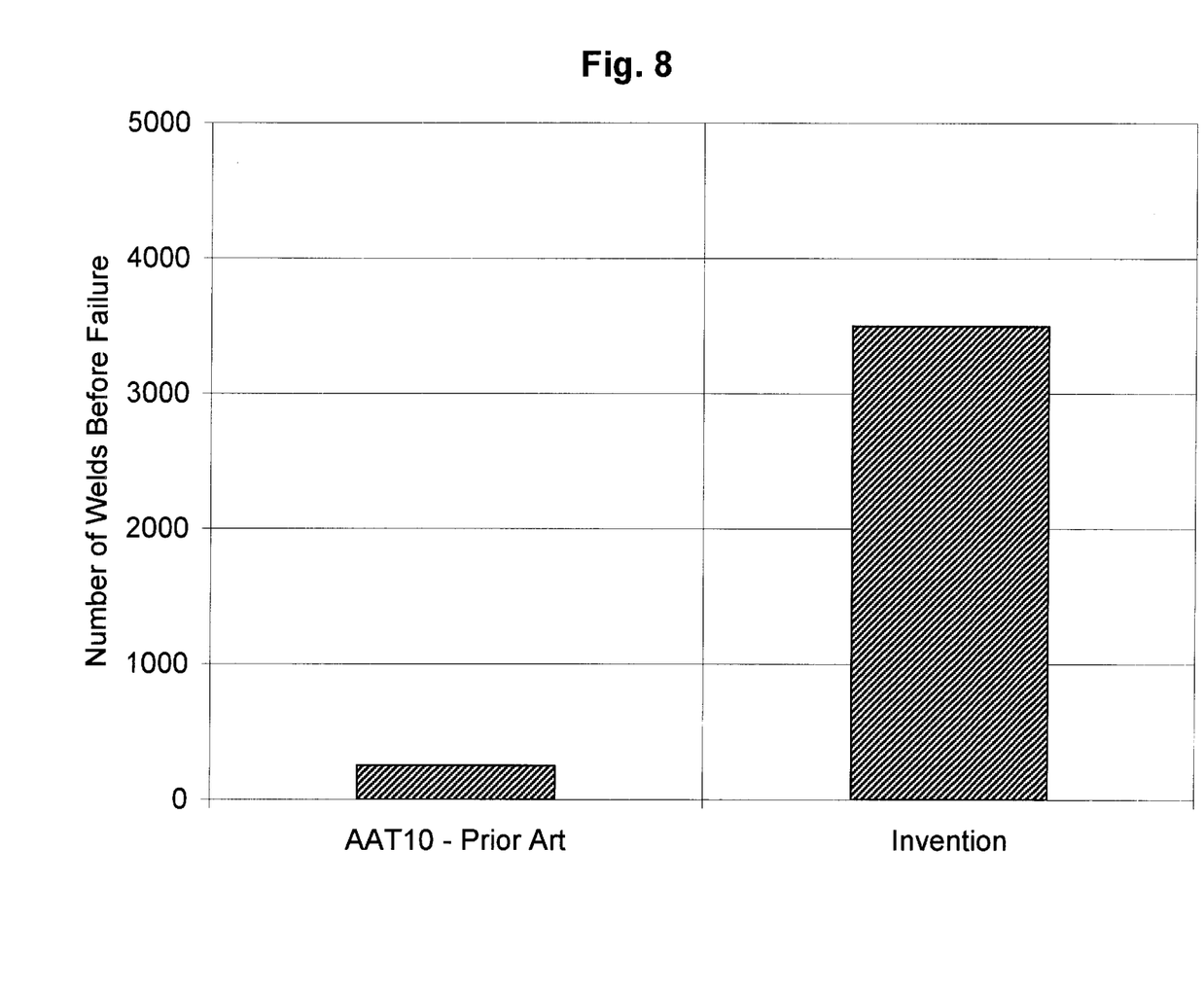
FIG. 8 is a bar graph of the number of welds on alloy 5182-O before failure of electrodes of the prior art and electrodes of the present invention.
Figure 9:
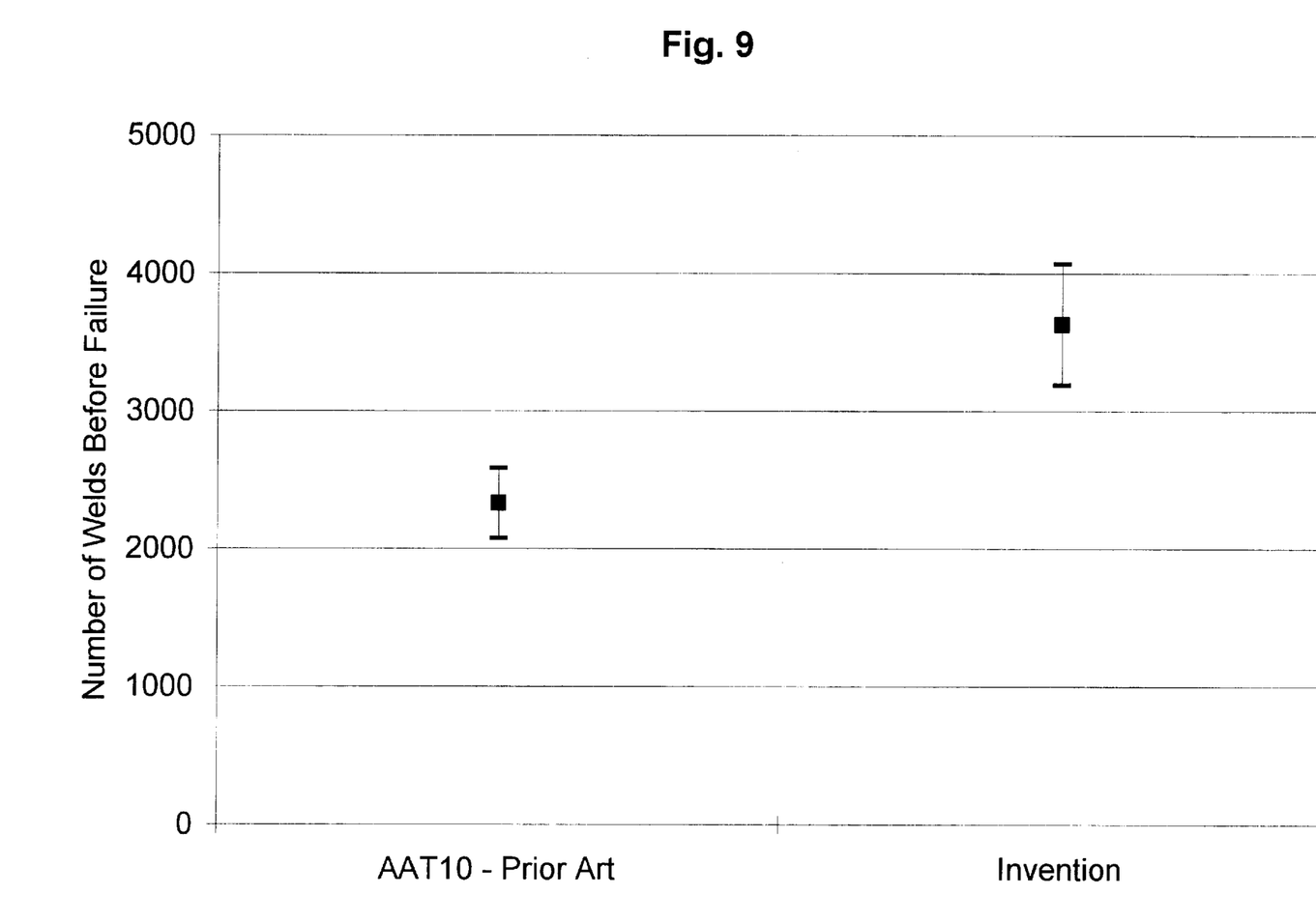
FIG. 9 is a bar graph of the number of welds on alloy 6111-T4 before failure of electrodes of the prior art and electrodes of the present invention.

In addition, the electrode life is greatly extended using the electrode geometry of the present invention. FIGS. 8 and 9 indicate the number of welds performed with a set of electrodes before failure thereof using electrodes having the geometry of the AAT10 Guidelines and electrodes having the geometry of the present invention when welding 0.9 mm thick sheets of Aluminum Alloys 5182-O and 6111-T4, respectively. A greater than ten-fold increase in the number of welds before failure of the electrodes was found using the electrodes of the present invention in welding alloy 5182-O over conventionally sized electrodes (FIG. 8) and over a 50 percent increase in electrode life was found using the electrodes of the present invention in welding alloy 6111-T4 over conventionally sized electrodes (FIG. 9.) It has also been found that the cycle time for the aluminum using the electrode geometry of the present invention may be decreased from that of the prior art.

In addition to the cost savings associated with the inventive process of resistance spot welding aluminum due to lower current requirements, the present invention also allows for a reduction in material costs of the aluminum work pieces being welded. In the present invention, the diameter of the weld nugget ($D_W$) approaches or equals the diameter of the electrode face ($D_F$). As a result, the electrodes may be placed close to the edge of overlapping flanges. Less overlap (less excess) of the overlapping flanges is required to achieve an effective weld. It has been found that the flanges may be reduced by about 10 percent over the recommended flange width recommended in the AAT10 Guidelines.

It will be appreciated by those skilled in the art that modifications may be made to the invention without departing from the concepts disclosed in the foregoing description. Such modifications are to be considered as included within the following claims unless the claims by their language expressly state otherwise. Accordingly, the particular embodiments described in detail herein are only illustrative and are not limiting to the scope of the invention which is to be given the full breadth of the appended claims and any and all equivalents thereof.

What is claimed is:

1. A method of resistance spot welding aluminum work pieces comprising the steps of:

contacting opposing sides of a pair of aluminum work pieces with a pair of opposing electrodes, each electrode having a tip with a face; and passing current from one electrode to the other electrode such that a weld nugget forms between the work pieces, wherein a ratio of the surface area of the weld nugget formed to the surface area of one electrode face is about 0.75 to about 1.

2. The method of claim 1 wherein the a ratio of the surface area of the weld nugget formed to the surface area of each electrode face is about 0.75 to about 1.

3. The method of claim 1 wherein the diameter of the weld nugget formed is about equal to the formula $5 \cdot \sqrt{t}$ where t is the gauge of the thinnest of the work pieces.

4. The method of claim 1 wherein the amount of current is about 15,000 amp to about 45,000 amp.

5. The method of claim 4 wherein the aluminum work pieces are formed from an Aluminum Association 5xxx or 6xxx series alloy.

6. The method of claim 5 wherein the aluminum work pieces are formed from an alloy selected from the group consisting of Aluminum Association alloys 5182, 5754, 6022 and 6111.

* * * * *